M. MIGHIRIAN.
ALTAR BREAD CUTTER.
APPLICATION FILED SEPT. 20, 1912.

1,076,384.

Patented Oct. 21, 1913.

2 SHEETS—SHEET 2.

Witnesses:
James Cronin
M. E. Laughlin

Inventor
Mardiros Mighirian
By Victor J. Evans
Attorney

UNITED STATES PATENT OFFICE.

MARDIROS MIGHIRIAN, OF NEW YORK, N. Y.

ALTAR-BREAD CUTTER.

1,076,384.

Specification of Letters Patent. Patented Oct. 21, 1913.

Application filed September 20, 1912. Serial No. 721,490.

*To all whom it may concern:*

Be it known that I, MARDIROS MIGHIRIAN, a subject of the Sultan of Turkey, residing at New York city, in the county of New York and State of New York, have invented new and useful Improvements in Altar-Bread Cutters, of which the following is a specification.

This invention relates to apparatus for cutting altar bread for communion purposes, and has for an object to provide apparatus of this character which will include such coöperating cutting elements that will maximize the cutting efficiency of the apparatus and minimize the labor and time during the cutting operation.

Another object of the invention is to provide cutting apparatus wherein a single sheet of bread can be accurately cut into a large number of individual disk-like portions and gravitationally discharged into a suitable receiving vessel.

Another object of the invention is to provide means for automatically cleaning the cutting knives on their return from the die, after the cutting operation and thereby insure a proper and even cutting of the bread and prevent the formation of ragged portions around the bread wafers or disks.

Another object of the invention is to provide means for guiding the cutting head toward the die on adjustment of the former to cutting position, and thereby prevent the accidental breakage of the knives when the latter are in effective cutting relation with the knife receiving openings of the die.

Another object of the invention is to provide means for yieldingly supporting the knife cleaner, whereby the same will be immediately returned to its initial position with relation to the effective cutting edges of the knives when the knife carrier is restored to its ineffective cutting position above the die.

Another object of the invention is to provide the die of the apparatus with a sheet guiding surface onto which the bread, in sheet form, may be readily guided beneath the cutting knives.

Other objects will appear and be better understood from that embodiment of my invention of which the following is a specification, reference being had to the accompanying drawings forming part hereof, in which:—

Figure 1:
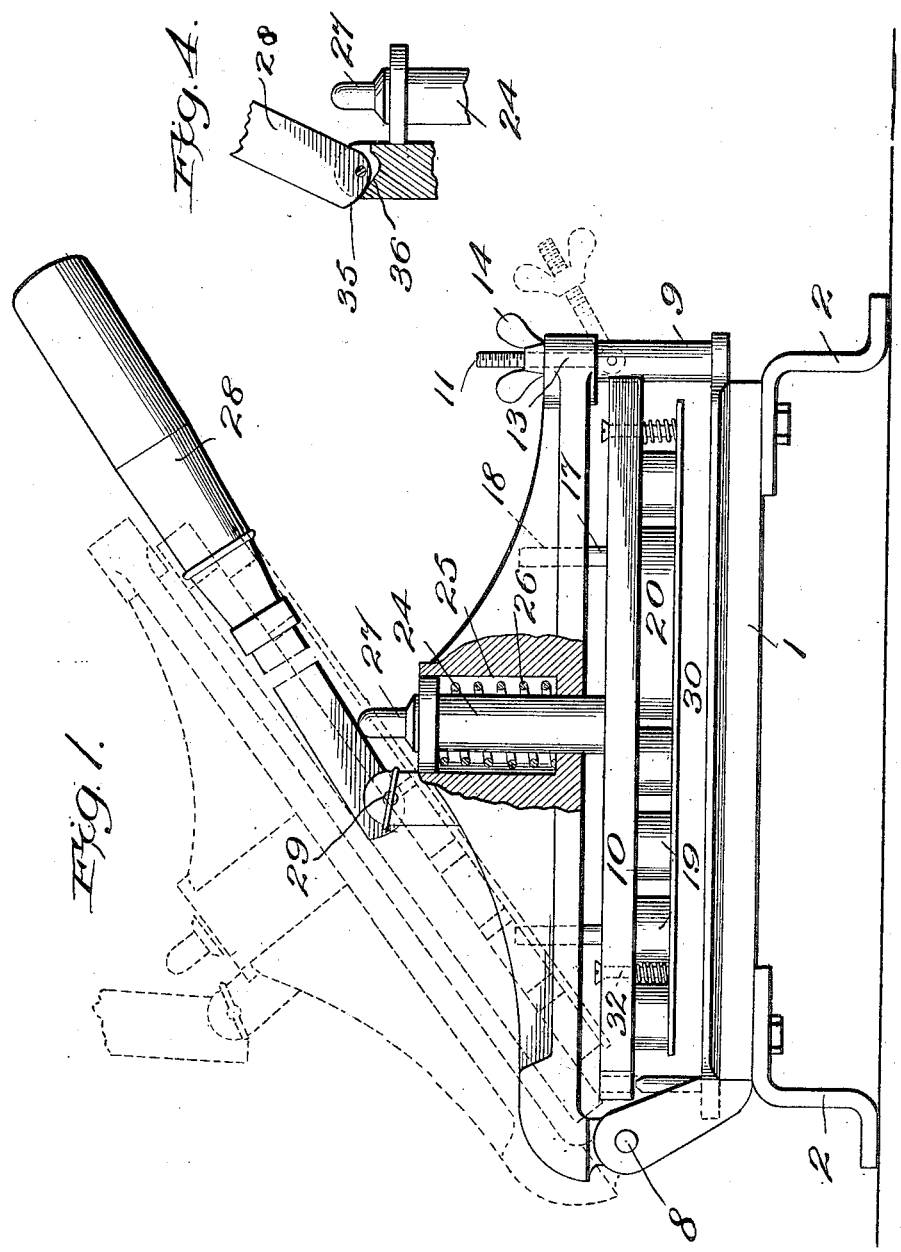
Figure 2:
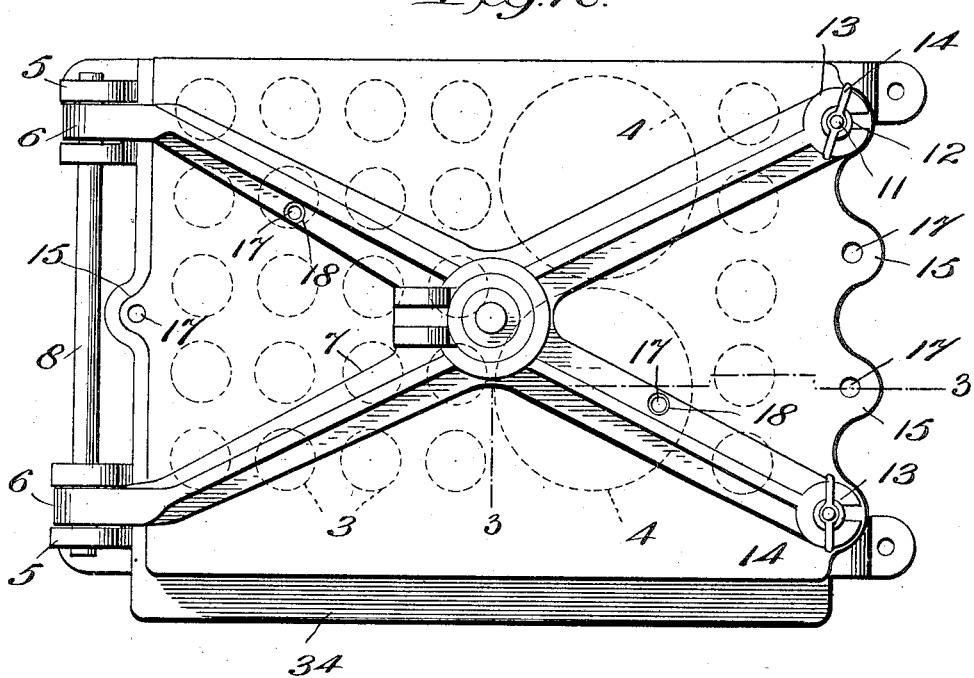
Figure 3:
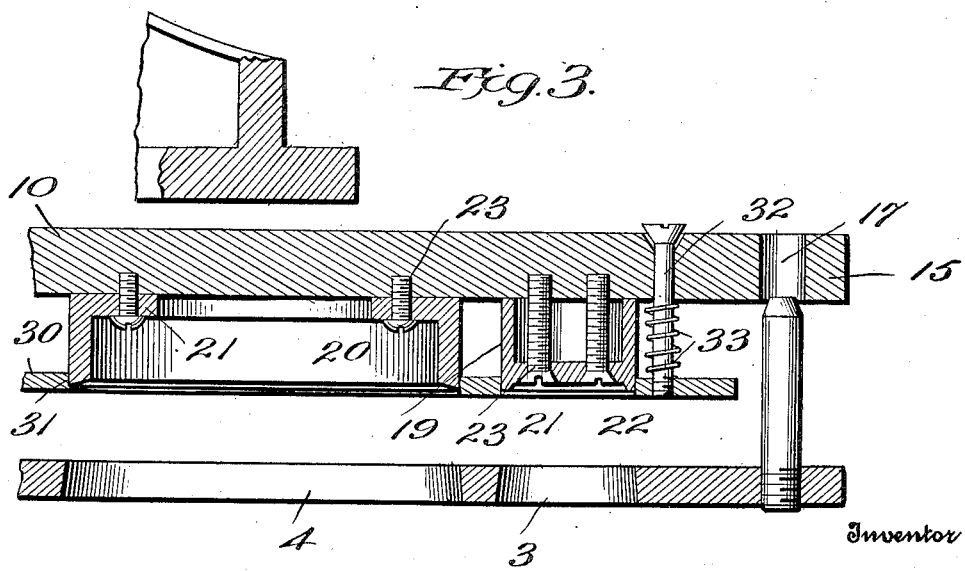

Figure 1 is a side view of the apparatus with parts in section and illustrating in dotted lines a raised position of the knife carrier. Fig. 2 is a top plan view thereof. Fig. 3 is a longitudinal section on the line 3—3 of Fig. 2, drawn on an enlarged scale. Fig. 4 is a detail view of the lever for actuating the cutters and for lifting the spider and coacting parts.

The apparatus is shown to include a table or flat die 1 which may be mounted upon supporting feet 2 with a view to spacing the die from a suitable receptacle (not shown) for catching the bread wafers or disks as they are cut. The die is provided with a plurality of small openings 3 and another plurality of larger openings 4, each being of a downwardly increasing diameter whereby the cut disks will be held against choking the openings during the cutting operation, it being evident that the disks will find free passage through the openings and that they will gravitationally pass into the receiving receptacle beneath the die when the cutting knives are returned to their initial positions. Knuckles 5 on one end of the die 1, are extended for a considerable distance above the upper surface thereof, where they are associated with the similar knuckles 6 of a spider 7 and connected therewith by means of a hinge rod 8. At the opposite end of the die are vertically rising posts 9 whose upper flat surfaces form supports against which the spider 7 is adapted to rest, as shown in full lines in Fig. 1. The surfaces then assist in the purpose of the hinge rod 9 toward operatively holding the knife carrier 10 in parallel relation with the die 1. Swinging bolts 11 on the posts 9 are adapted to be adjusted into the slots 12 in portions 13 of the spider which protrude beyond the adjacent end of the knife carrier, and as illustrated said bolts are provided with winged nuts 14 that are adjustable to bear against said portions 13, whereby to hold the spider against working on the hinge rod 8.

The knife carrier 10 is provided at its ends with bosses 15 having vertical passages 16 therein to accommodate vertical guide studs 17 which rise from the die. The studs are designed with a view to holding the knife carrier against lateral shifting during the cutting operation to thereby insure a proper finding of the cutting knives in the described openings of the die 1. Similar studs 17a rise from the knife carrier and pass through guide passages 18 in the spider 7.

The carrier 10 is provided with a plurality of small cutting knives 19 and another plurality of somewhat larger knives 20, the latter and the former being respectively associated with the passages 4 and 3, whereby they may be made to pass therethrough when the carrier is moved in one direction. These knives are circular and as shown each is provided with a lower flat head 21 which is disposed above the effective cutting edges of the knife, while the edges 22 of each knife are flared in the direction of the head to invite a shear cut of the bread and obviate tearing the edges of the formed bread disk in the cutting operation. Each knife is secured to the carrier 10 by means of a plurality of screws 23 which are passed through the heads 21 and vertically through the knives. A plunger 24 rises from the center of the knife carrier and as illustrated it is slidably mounted in a receiving and guiding cylinder 25 of the spider 7. A spring 26 in the cylinder engages against the plunger and exerts its power to hold the carrier normally elevated above the die. The plunger carries an upper reduced stem 27 which is normally disposed above the plane of the cylinder where it will lie directly in the path of the actuating lever 28, the latter having pivotal connection at 29 upon the spider 7.

A combined ejector and knife cleaner 30 is disposed below the knife carrier, being provided with correspondingly formed passages 31 for the knives 19 and 20. Said ejector is supported by adjustable screws 32 which are slidably mounted in the knife carrier. Springs 33 are interposed between the carrier 10 and the ejector 30 whereby to hold the latter normally at one limit of its movement and flush with the effective cutting edges of the knives 19 and 20 where it will be adapted to come in flat contact with the die 1 when the carrier is brought to cutting position. It is evident that the ejector may be adjusted with relation to the cutting edges of the knives 19 and 20 through the medium of the screws 32 so that it may be properly associated with all of the knives to insure the removal therefrom of particles of bread when the cutter is returned to its initial position. One side of the die extends beyond the plane of the cutter so as to provide a ledge 34 onto which sheets of bread may be readily guided beneath the cutting knives.

A shoulder 36 is formed on the spider at a point adjacent to the pivot 29 of the lever and as shown, said shoulder is disposed directly in the path of a stop surface 35 of the lever 28, whereby when the lever is adjusted to one position it will be held against further movement and by pressing up on the lever the spider and the knife carrier may be exposed to the dotted line position, as shown in Fig. 1.

What is claimed as new is:

In a device of the character described, the combination with a die and an adjustable cutter adapted to be actuated by a plunger and a lever, of a bearing, a lever eccentrically mounted in said bearing, said bearing having a shoulder adapted for engagement by the end of the lever when the lever is raised, whereby the swinging movement of the lever is limited as required for exerting a lifting power upon the lever.

In testimony whereof I affix my signature in presence of two witnesses.

MARDIROS MIGHIRIAN.

Witnesses:
 JAMES A. KOEHL,
 GEO. A. BYRNE.

---

Copies of this patent may be obtained for five cents each, by addressing the "Commissioner of Patents, Washington, D. C."